Dec. 16, 1969  C. F. READ  3,484,130
AIR FLOW DEFLECTOR FOR MOTOR VEHICLES
Filed Sept. 1, 1967
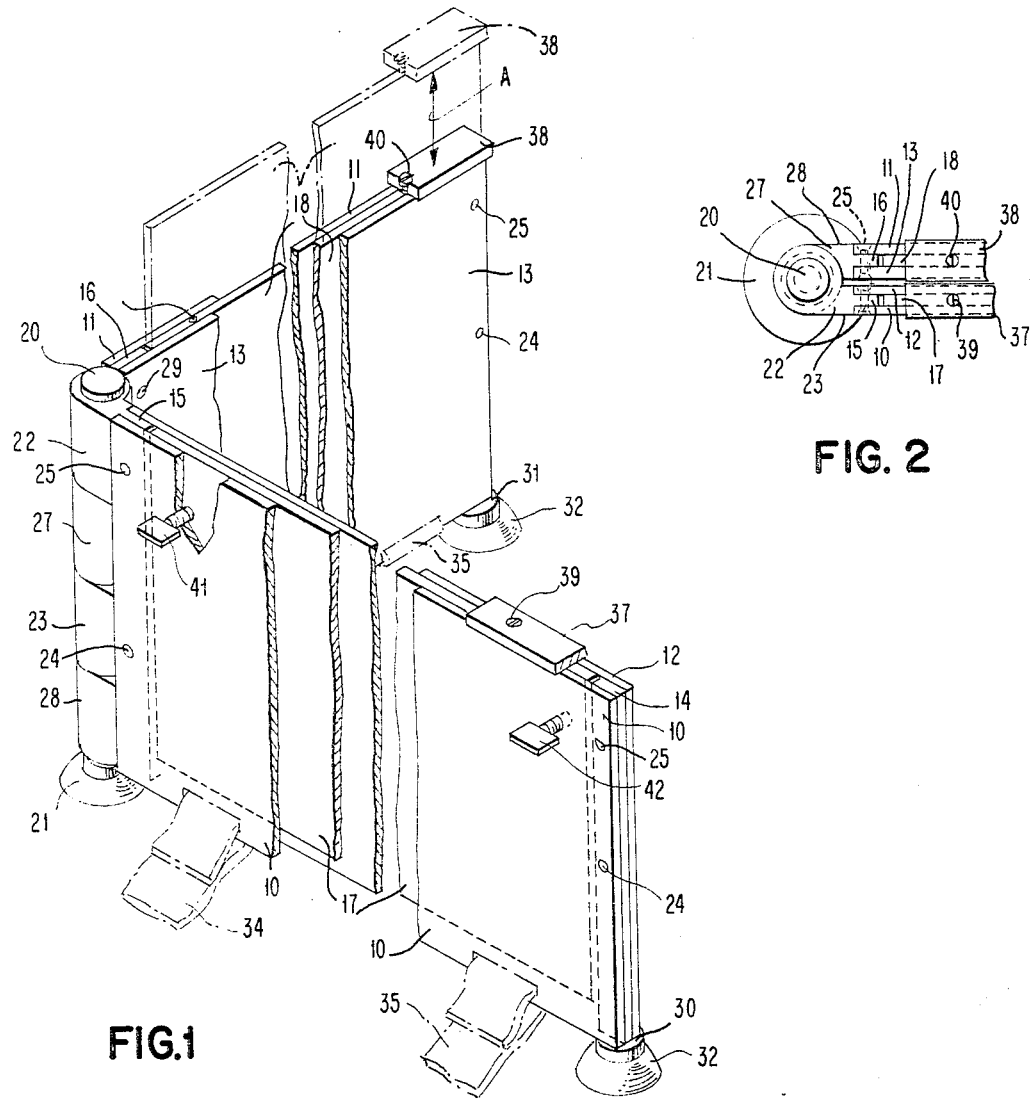
FIG. 1
FIG. 2
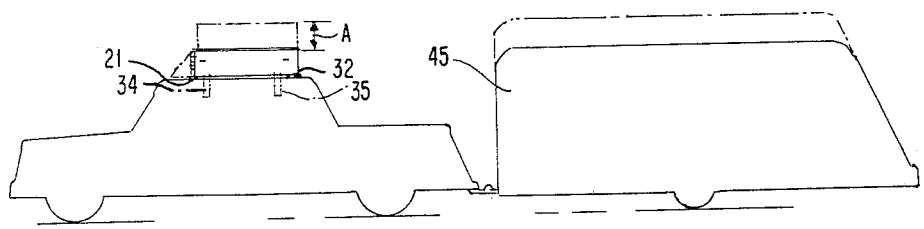
FIG. 3
INVENTOR
CHARLES F. READ
BY Frederick Bartholy
ATTORNEY United States Patent Office 3,484,130
Patented Dec. 16, 1969

3,484,130
AIR FLOW DEFLECTOR FOR
MOTOR VEHICLES
Charles F. Read, Bonna Drive, Port Crane, N.Y. 13833
Filed Sept. 1, 1967, Ser. No. 665,113
Int. Cl. B60j 9/00; B60q 9/04
U.S. Cl. 296—1                                    1 Claim

ABSTRACT OF THE DISCLOSURE

An air flow deflector to be placed on the roof of a motor vehicle pulling a trailer comprising a pair of upright panels terminating at one end in a hinged joint. This permits separation of the panels at desired angles to form a wedge-shaped structure, the apex of which, when mounted on the roof of a vehicle, points in the direction of travel. The height of the structure is adjustable to correspond to the height of the trailer pulled by the car.

Trailers attached to passenger cars are widely used on many occasions for short or long distance travel. A trailer is comparatively bulky and larger than a car so that its broad front extends above the roof of the vehicle which pulls it. At moderate speeds the air impact against the front of the trailer is of no material consequence. However, at greater speeds, i.e., the normal speed on superhighways, the wind resistance of the trailer becomes greater, presenting a load on the vehicle which progressively increases with the increase in speed. This added load requires an expenditure of energy resulting in an increased cost in miles per gallon of gasoline which the vehicle would normally require.

It is accordingly a primary object of this invention to improve the power efficiency of a motor vehicle pulling a trailer and, to this end, means are provided for lessening the impact resistance of the trailer body.

It is a further object of the invention to provide an air flow deflector which, when attached to the roof of a trailer-pulling vehicle, will reduce the wind resistance of the trailer body.

It is a particular feature of the invention that the air flow deflector in accordance therewith is simple in construction and may easily be erected when needed, requiring a minimum amount of space for storage in the vehicle when not in use.

A particular advantage of the construction of the air flow deflector in accordance with this invention resides in the ease of assembly and mounting as well as the adaptability of adjustment to various effective heights corresponding to the trailer hitched to the car.

Other objects, features and advantages will be apparent from the following description of the invention, defined in particularity in the appended claim, and taken in connection with the accompanying drawing, in which:

FIG. 1 is a side elevational view in perspective, partially cut away, of a preferred embodiment of an air flow deflector construction.

FIG. 2 is a partial top view of the deflector structure in closed position for storage.

FIG. 3 is an outline view of a vehicle and trailer showing the effective use of the air flow deflector mounted on the top of the vehicle.

Referring to the drawings, essentially the deflector assembly consists of a pair of upright panels having outer and inner members 12 and 13 separated by spacers 14, 15 and 16 at a distance from each other in order to provide a space therebetween accommodating center panel members 17 and 18. The panel members are of oblong configuration, being joined at one end for pivotal movement in a hinge post 20 which forms one support of the assembly, being provided at the bottom with a suction cup 21. The panel members and supports thereof may be constructed of a light metal such as aluminum. Plastic material or wood may also be used.

Hinge sleeves 22 and 23 are attached to panel members 10 and 12 with suitable rivets or bolts 24 and 25. Correspondingly, hinge sleeves 27 and 28 are attached to panel members 11 and 13 by suitable rivets or bolts such as 29 visible in the figure. In this manner the panel members may be opened and closed around the post 20 at any desired angle to form a wedge-shaped body. The opposite end of the members are fastened to suitable posts such as 30 and 31, respectively, having at the base thereof suction cups 32 and 33 for securing the assembly to the roof of the car.

It is obvious that other means for fastening may be used for the assembly. As indicated in dotted lines, straps 34 and 35 may be provided which fit in slots in a conventional manner and enter through the windows of the car to be secured by suitable buckles to firmly hold the deflector structure in place.

When the panel members are entirely closed they are flat against each other as seen in FIG. 2 so that the assembly may be conveniently carried in the trunk of the car when not in use.

Between the inner and outer panels 12 and 10 and 13 and 11, respectively, are placed center panels 17 and 18, having upper ledge pieces 37 and 38, respectively, secured to them by suitable bolts 39 and 40 so that they may be lifted in a vertical direction to extend the height of the assembly. This is shown in phantom view, the distance of extension being indicated by the arrow line A.

Locking studs 41 and 42 threaded into the outer panel 10 may be used to secure the extension of the center panel 17 to the height desired. A similar arrangement, not seen in the figure, is used for the center panel 18.

As seen in FIG. 3, the deflector structure is shown attached to the roof of a car which is pulling a trailer 45. The front of the wedge-shaped structure of the deflector faces in the direction of travel of the car so that the air flow which would normally impact against the front of the trailer 45 is deflected laterally, minimizing the air resistance which would normally be encountered. The dotted outlines of the trailer height and similar outlines of the deflector body show the adjustable feature so that the effective height of the deflector may correspond to the height of the trailer. A designates the distance to which the center panels 17 and 18 have been extended.

The air flow deflector described above functions to cut the air body and deflect it from the broad front of the trailer. The useful angle may be adjusted for best efficiency. While not shown here, the panel member may obviously be constructed as to be longitudinally extensible even beyond the width of the car so as to match the width of the trailer itself.

The invention in its broader aspect is not limited to the specific embodiments herein shown and described but changes may be made therefrom with the scope of the accompanying claim, without departing from the principles of the invention and without sacrificing its chief advantages.

What is claimed is:

1. An air flow deflector adapted to be mounted on the roof of a motor vehicle when pulling a trailer which comprises:

(a) a pair of upright panel members of oblong configuration, each comprising a pair of juxtaposed panels separated from each other at a predetermined distance defining a space between them, an inner panel member of like configuration slidably supported in said space for vertical movement whereby the effective height may be adjusted to substantially correspond to the height of the front of a trailer attached to said car and fastening means for securing said inner members at the desired height;

(b) means for interconnecting said members at one end to form a wedge-shaped structure, the apex of which is pointing in the direction of travel of said vehicle; and (c) support means for securing said structure to the roof of said vehicle.

References Cited

UNITED STATES PATENTS

| | | | |
|---|---|---|---|
| 2,863,695 | 12/1958 | Stamm | 296—1 |
| 3,348,873 | 10/1967 | Saunders | 296—1 |
| 3,276,811 | 10/1966 | Schmidt | 296—1 |
| 2,914,231 | 11/1959 | Hornke | 296—91 |
| 2,112,709 | 3/1938 | Reynolds | 296—91 |

FOREIGN PATENTS 810,807  1/1937  France.

PHILIP GOODMAN, Primary Examiner

U.S. Cl. X.R.

224—42.1